United States Patent
Yamashita et al.

(10) Patent No.: US 12,438,321 B2
(45) Date of Patent: Oct. 7, 2025

(54) ROTARY CONNECTOR DEVICE (71) Applicants: FURUKAWA ELECTRIC CO., LTD., Tokyo (JP); FURUKAWA AUTOMOTIVE SYSTEMS INC., Inukami-gun (JP)

(72) Inventors: Rodrigo Kendy Yamashita, Inukami-gun (JP); Shinichi Hamasaki, Inukami-gun (JP); Takahisa Kakudo, Inukami-gun (JP); Yoji Tajiri, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

(*) Notice: Subject to any disclaimer, the term of this patent is extended or adjusted under 35 U.S.C. 154(b) by 604 days.

(21) Appl. No.: 17/952,325

(22) Filed: Sep. 26, 2022

(65) Prior Publication Data
US 2023/0016058 A1 Jan. 19, 2023

Related U.S. Application Data (63) Continuation of application No. PCT/JP2021/005771, filed on Feb. 26, 2021.

(30) Foreign Application Priority Data

Mar. 31, 2020 (JP) .................. 2020-063100

(51) Int. Cl.
*H01R 35/00* (2006.01)
*H01R 35/02* (2006.01)

(52) U.S. Cl.
CPC .................. *H01R 35/025* (2013.01)

(58) Field of Classification Search
CPC .................................................. H01R 35/025
See application file for complete search history.

(56) References Cited

U.S. PATENT DOCUMENTS

| 4,722,690 A * | 2/1988 | Priede | H01R 35/025 |
| | | | 439/15 |
| 6,416,355 B1 * | 7/2002 | Liao | H02G 11/02 |
| | | | 439/501 |

(Continued)

FOREIGN PATENT DOCUMENTS

| EP | 1273481 A2 | 1/2003 |
| JP | 2000-294359 | 10/2000 |

(Continued)

OTHER PUBLICATIONS

International Search Report for corresponding International Application No. PCT/JP2021/005771, Apr. 27, 2021.

(Continued)

*Primary Examiner* — Phuong Chi Thi Nguyen
(74) *Attorney, Agent, or Firm* — Mori & Ward, LLP (57) ABSTRACT

A rotary connector device includes a stator, a rotator, a first connector, and a second connector. The rotator is rotatable about a rotation axis with respect to the stator. The first connector is provided at the rotator. The second connector is provided at the stator. The first connector includes a first lead block which is attached to the rotator and a second lead block which is a member separated from the first lead block and is attached to the rotator. When viewed from an axial direction along the rotation axis, the first lead block is disposed so as to overlap at least partially the second lead block.

13 Claims, 8 Drawing Sheets

(56) References Cited

U.S. PATENT DOCUMENTS

| | | | |
|---|---|---|---|
| 6,425,779 B1 * | 7/2002 | O'Brien, II | H01R 35/025 |
| | | | 439/162 |
| 6,948,706 B1 * | 9/2005 | Wyatt | F16F 1/10 |
| | | | 439/15 |
| 2003/0008541 A1 | 1/2003 | Oguma | |
| 2004/0067670 A1 | 4/2004 | Rhein et al. | |
| 2005/0045696 A1 * | 3/2005 | Bolen | B60R 16/0215 |
| | | | 228/179.1 |

FOREIGN PATENT DOCUMENTS

| | | |
|---|---|---|
| JP | 2003-022879 | 1/2003 |
| JP | 2006-502549 | 1/2006 |
| JP | 2009-158170 | 7/2009 |
| JP | 2015-109144 | 6/2015 |
| JP | 2017-199594 | 11/2017 |
| JP | 2019-164953 | 9/2019 |

OTHER PUBLICATIONS

Korean Office Action for corresponding KR Application No. 10-2022-7038083, Feb. 13, 2025 (w/ English machine translation).
Japanese Office Action for corresponding JP Application No. 2022-511641, May 14, 2024 (w/ English machine translation).
Written Opinion for corresponding International Application No. PCT/JP2021/005771, Oct. 13, 2022.
Extended European Search Report for corresponding EP Application No. 21779589.7-1009, Aug. 22, 2023.
Chinese Office Action for corresponding CN Application No. 202180025915.6, Jun. 7, 2025 (w/ English machine translation).

* cited by examiner

ROTARY CONNECTOR DEVICE

CROSS-REFERENCE TO RELATED APPLICATIONS

The present application is a continuation application of International Application No. PCT/JP2021/005771, filed Feb. 16, 2021, which claims priority to Japanese Patent Application No. 2020-063100 filed Mar. 31, 2020. The contents of these applications are incorporated herein by reference in their entirety.

BACKGROUND

Technical Field

The technology disclosed in the present application relates to a rotary connector device.

Background Art

Japanese Unexamined Patent Publications JP2000-294359A, JP2009-158170A, and JP2019-164953A describe a rotary connector device including a lead block.

SUMMARY

A rotary connector device according to an aspect includes a stator, a rotator, a first connector, and a second connector. The rotator is rotatable about a rotation axis with respect to the stator. The first connector is provided at the rotator. The second connector is provided at the stator. The first connector includes a first lead block which is attached to the rotator and a second lead block which is a member separated from the first lead block and is attached to the rotator. When viewed from an axial direction along the rotation axis, the first lead block is disposed so as to overlap at least partially the second lead block.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Hereinafter, embodiments will be described with reference to the drawings. In the drawings, the same reference signs denote corresponding or identical components.

Figure 1:
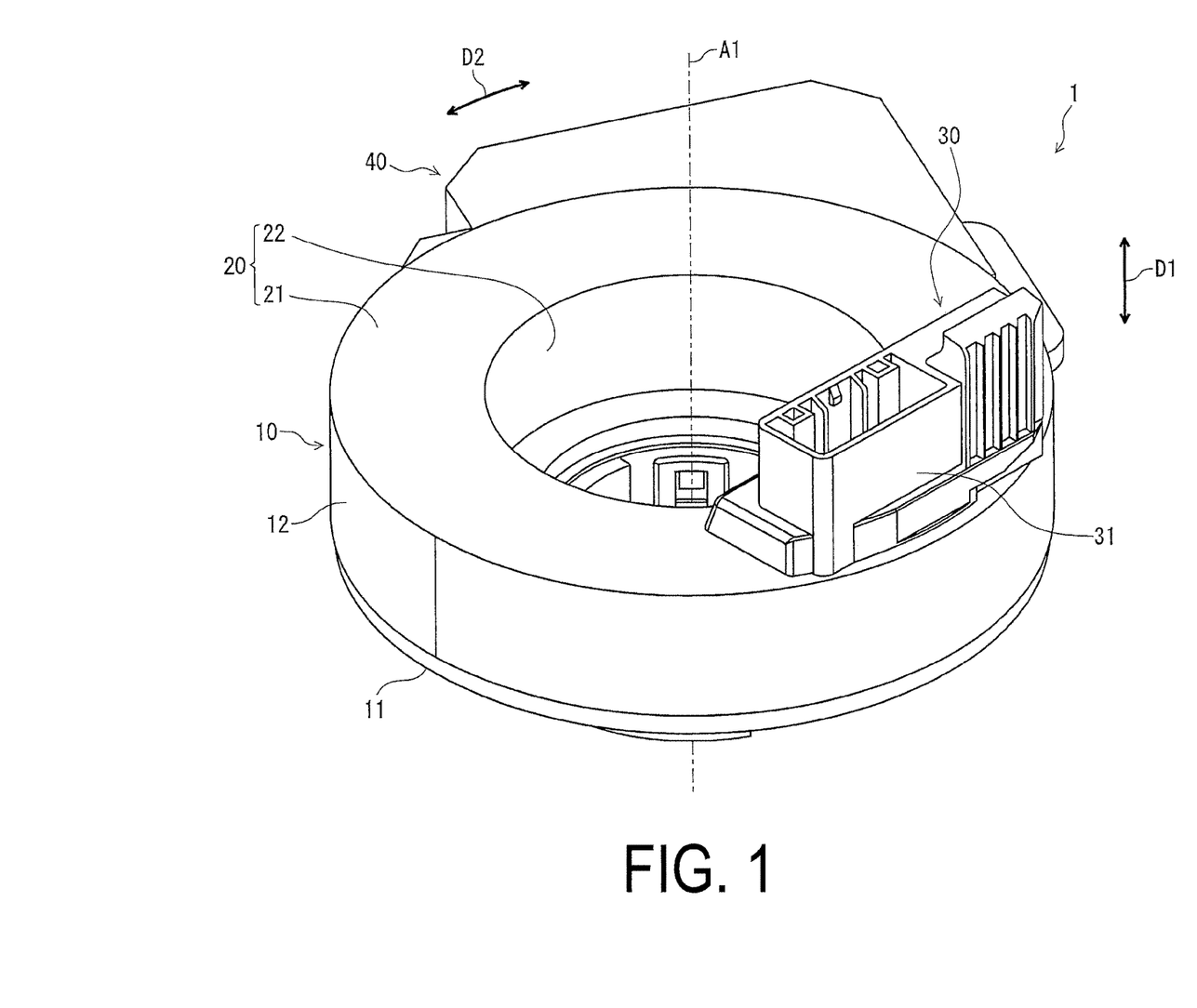
FIG. 1 is a perspective view of a rotary connector device according to the present embodiment.

As illustrated in FIG. 1, a rotary connector device 1 includes a stator 10, a rotator 20, a first connector 30, and a second connector 40. The rotator 20 is provided so as to be rotatable about a rotation axis A1 with respect to the stator 10. The first connector 30 is provided at the rotator 20. The second connector 40 is provided at the stator 10.

In the present embodiment, for example, the stator 10 is configured to be fixed to a vehicle body, and the rotator 20 is configured to be fixed to a steering wheel. The first connector 30 is configured to be electrically connected to, for example, a steering side connector. The steering side connector is electrically connected to electric circuits such as switches of the steering wheel and an airbag device. The second connector 40 is configured to be electrically connected to a vehicle body side connector. The vehicle body side connector is electrically connected to electric circuits such as a control device.

The rotator 20 includes a first ring plate 21 and an inner cylindrical portion 22 which extends from an inner peripheral portion of the first ring plate 21 in an axial direction D1. The first connector 30 is provided at the first ring plate 21. The first connector 30 includes a first connector housing portion 31. The first connector housing portion 31 extends from the first ring plate 21 in the axial direction D1. The stator 10 includes a second ring plate 11 and an outer cylindrical portion 12 which extends from an outer peripheral portion of the second ring plate 11 in the axial direction D1.

Figure 2:
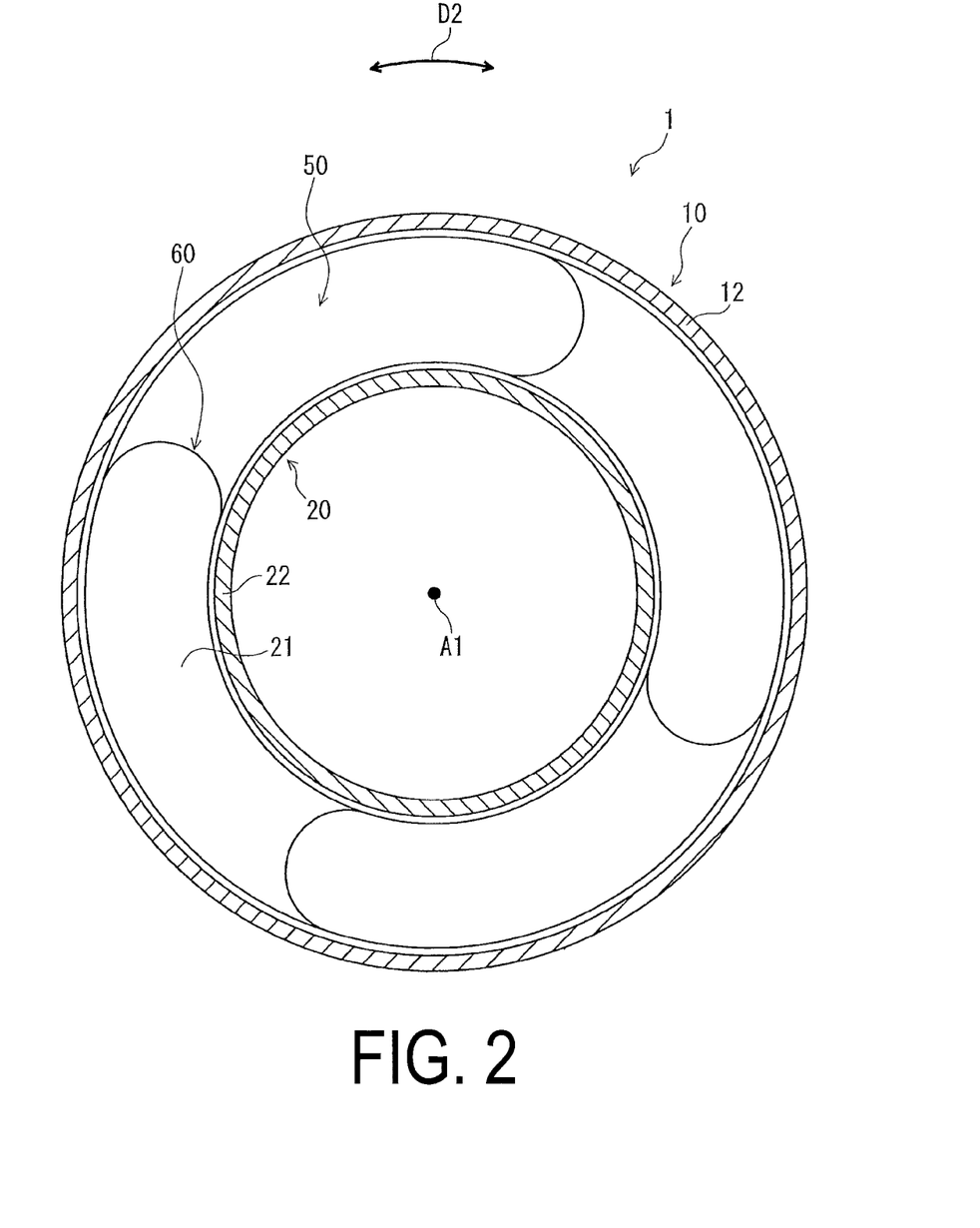
FIG. 2 is a cross-sectional view of the rotary connector device illustrated in FIG. 1.

As illustrated in FIG. 2, the stator 10 and the rotator 20 defines a cable housing space 50 provided so as to surround the rotation axis A1, between the stator 10 and the rotator 20. For example, the cable housing space 50 is annular and extends in a circumferential direction D2 relative to the rotation axis A1. The rotary connector device 1 includes an electrical cable 60. The electrical cable 60 electrically connects the first connector 30 to the second connector 40. The electrical cable 60 is disposed in the cable housing space 50. The electrical cable 60 is flexible and has a flat shape. The electrical cable 60 is also referred to as a flexible flat cable.

Figure 3:
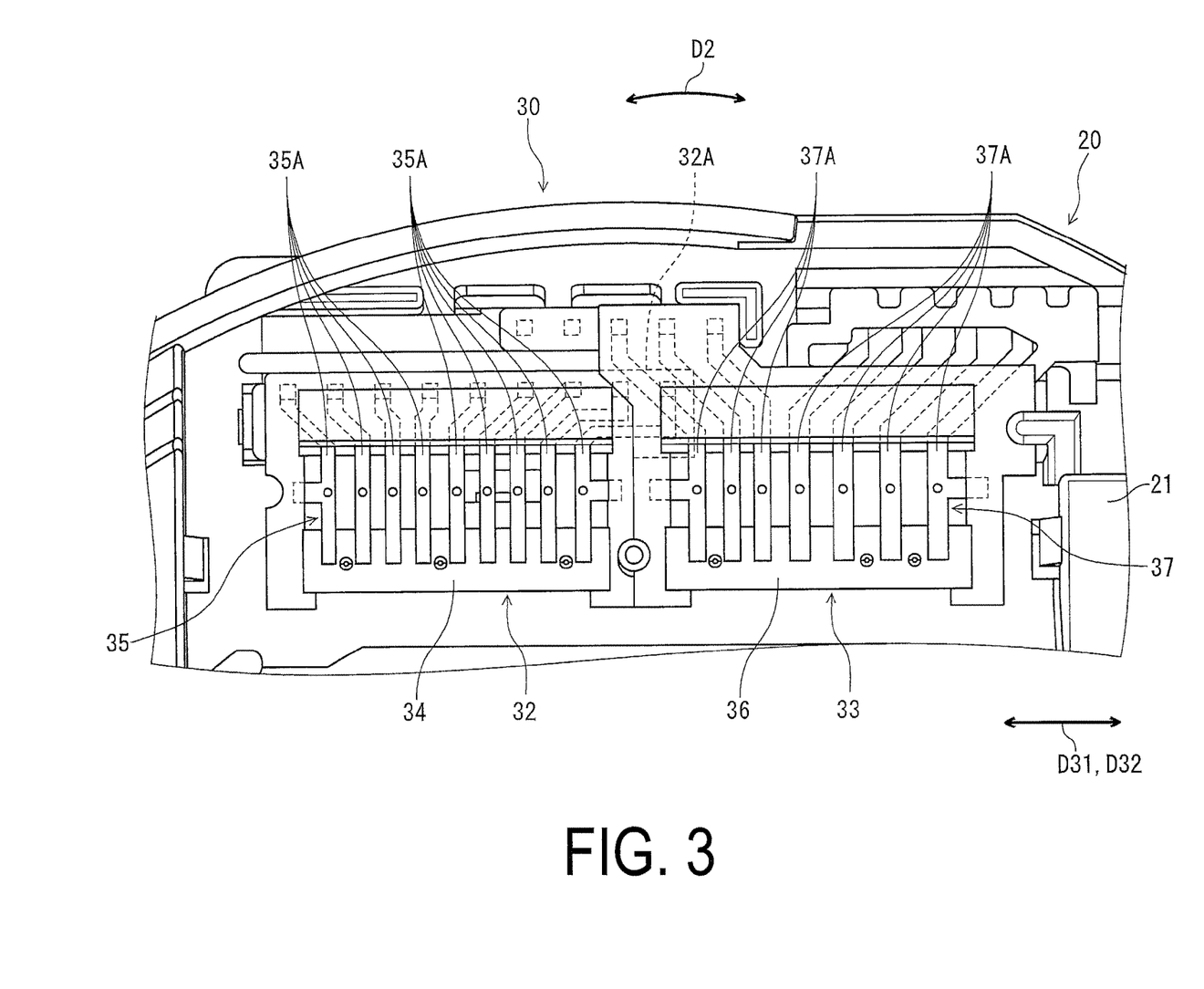
FIG. 3 is a partial plan view of a first lead block and a second lead block of a first connector as viewed from the back side of a rotator.

As illustrated in FIG. 3, the first connector 30 includes a first lead block 32 which is attached to the rotator 20 and a second lead block 33 which is a member separated from the first lead block 32 and is attached to the rotator 20. When viewed from the axial direction D1 along the rotation axis A1, the first lead block 32 is disposed so as to overlap at least partially the second lead block 33. When viewed from the axial direction D1, the first lead block 32 and the second lead block 33 are disposed side by side in the circumferential direction D2 defined about the rotation axis A1. In the present embodiment, the first lead block 32 includes an overlapping portion 32A. When viewed from the axial direction D1, the overlapping portion 32A is disposed so as to overlap the second lead block 33.

The first lead block 32 includes a first lead block body 34 including a non-metal material and a first terminal portion 35 including a metal material. The second lead block 33 includes a second lead block body 36 including a non-metal material and a second terminal portion 37 including a metal material. The first terminal portion 35 is provided at least partially in the first lead block body 34. The second terminal portion 37 is provided at least partially in the second lead block body 36. For example, the first lead block body 34 and the second lead block body 36 are made of resin. The first terminal portion 35 is embedded in the first lead block body 34 by insertion molding. The second terminal portion 37 is embedded in the second lead block body 36 by insertion molding.

When viewed from the axial direction D1, the first lead block body 34 is disposed so as to overlap at least partially the second lead block body 36. When viewed from the axial direction D1, the first terminal portion 35 is disposed so as to overlap at least partially the second terminal portion 37. In the present embodiment, the first lead block body 34 includes the overlapping portion 32A. That is, the overlapping portion 32A is made of resin. At least a portion of the first terminal portion 35 is disposed in the overlapping portion 32A.

The first terminal portion 35 includes a plurality of first busbars 35A disposed side by side in a first direction D31. The second terminal portion 37 includes a plurality of second busbars 37A disposed side by side in a second direction D32. When viewed from the axial direction, the first lead block 32 and the second lead block 33 are disposed side by side in at least one of the first direction D31 and the second direction D32. When viewed from the axial direction, the first terminal portion 35 and the second terminal portion 37 are disposed side by side in at least one of the first direction D31 and the second direction D32. At least one of the plurality of first busbars 35A is disposed in the overlapping portion 32A. When viewed from the axial direction D1, the plurality of first busbars 35A are disposed so as to overlap at least partially the plurality of second busbars 37A. In the present embodiment, when viewed from the axial direction D1, one of the plurality of first busbars 35A is disposed so as to overlap one of the plurality of second busbars 37A. However, when viewed from the axial direction D1, the first terminal portion 35 may be disposed so as not to overlap the second terminal portion 37. When viewed from the axial direction D1, the plurality of first busbars 35A may be disposed so as not to overlap the plurality of second busbars 37A.

In the present embodiment, when viewed from the axial direction D1, the first lead block 32 and the second lead block 33 are disposed side by side in the first direction D31 and the second direction D32. When viewed from the axial direction D1, the first terminal portion 35 and the second terminal portion 37 are disposed side by side in the first direction D31 and the second direction D32. However, when viewed from the axial direction D1, the first lead block 32 and the second lead block 33 may be disposed side by side only in one of the first direction D31 and the second direction D32. When viewed from the axial direction D1, the first terminal portion 35 and the second terminal portion 37 may be disposed side by side only in one of the first direction D31 and the second direction D32. When viewed from the axial direction D1, the first lead block 32 and the second lead block 33 need not be disposed side by side in the first direction D31 and the second direction D32. When viewed from the axial direction D1, the first terminal portion 35 and the second terminal portion 37 need not be disposed side by side in the first direction D31 and the second direction D32.

In the present embodiment, the first direction D31 is parallel to the second direction D32. However, the first direction D31 may be inclined with respect to the second direction D32, or may be orthogonal to the second direction D32.

Figure 4:
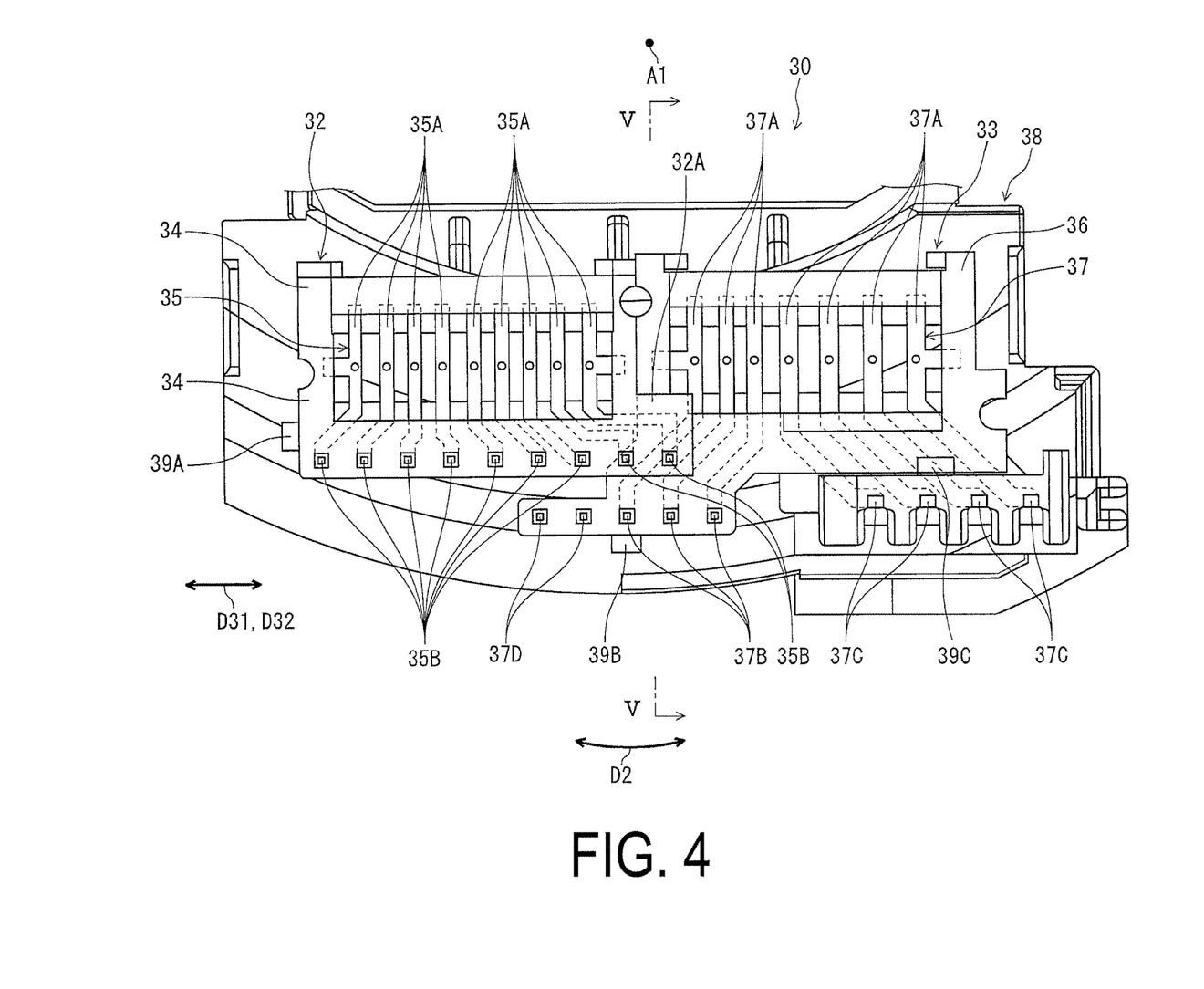
FIG. 4 is a partial plan view of the first lead block, the second lead block, and a connector cover.

As illustrated in FIG. 4, the first terminal portion 35 includes a plurality of first terminals 35B which are connected to the plurality of first busbars 35A and extend from the plurality of first busbars 35A in the axial direction D1. The second terminal portion 37 includes a plurality of second terminals 37B which are connected to the plurality of second busbars 37A and extend from the plurality of second busbars 37A in the axial direction D1. The plurality of first terminals 35B are disposed side by side in the first direction D31. The plurality of second terminals 37B and 37C are disposed side by side in the second direction D32. When viewed from the axial direction D1, at least one of the plurality of first terminals 35B is disposed between the rotation axis A1 and at least one of the plurality of second terminals 37B and 37C. The plurality of second terminals 37B and 37C are disposed on an outer side in a radial direction of the plurality of first terminals 35B with respect to the rotation axis A1. However, the positional relationship between the plurality of first terminals 35B and the plurality of second terminals 37B and 37C is not limited to that described in the present embodiment. For example, when viewed from the axial direction D1, at least one of the plurality of second terminals 37B and 37C may be disposed between the rotation axis A1 and at least one of the plurality of first terminals 35B. In other words, the plurality of first terminals 35B may be disposed on an outer side in the radial direction of the plurality of second terminals 37B and 37C with respect to the rotation axis A1.

The second terminal portion 37 includes a plurality of dummy terminals 37D. The plurality of dummy terminals 37D are not connected to the plurality of second busbars 37A. The plurality of second terminals 37B and the plurality of dummy terminals 37D are disposed side by side in the second direction D32. At least one of the plurality of dummy terminals 37D may be omitted from the second terminal portion 37.

In the present embodiment, the total number of the plurality of first terminals 35B is greater than the total number of the plurality of second terminals 37B and 37C. The total number of the plurality of first terminals 35B is equal to the total number of the plurality of first busbars 35A. The total number of the plurality of second terminals 37B and 37C is equal to the total number of the plurality of second busbars 37A. A total number of the plurality of second terminals 37B is less than a total number of the plurality of second terminals 37C. However, the total number of the plurality of first terminals 35B may be less than the total number of the plurality of first busbars 35A. The total number of the plurality of second terminals 37B and 37C may be less than the total number of the plurality of second busbars 37A. The total number of the plurality of first terminals 35B may be equal to the total number of the plurality of second terminals 37B and 37C or less than the total number of the plurality of second terminals 37B and 37C. The total number of the plurality of second terminals 37B may be equal to the total number of the plurality of second terminals 37C or less than the total number of the plurality of second terminals 37C.

As illustrated in FIG. 4, the first connector 30 includes a connector cover 38. The connector cover 38 is attached to the first ring plate 21 of the rotator 20.

Figure 5:
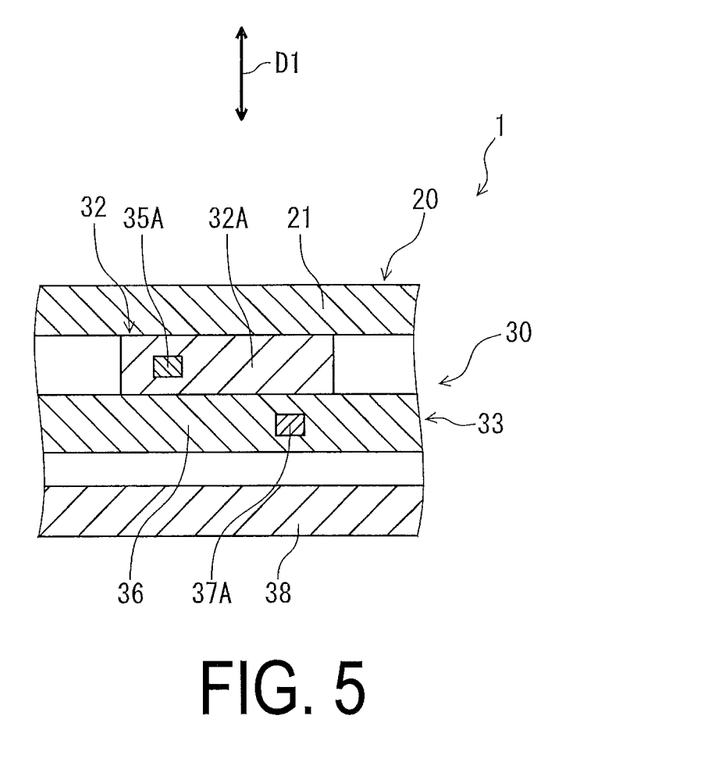
FIG. 5 is a partial cross-sectional view of the rotary connector device taken along a line V-V in FIG. 4.

As illustrated in FIG. 5, in a state where the connector cover 38 is attached to the first ring plate 21, the first lead block 32 and the second lead block 33 are held between the first ring plate 21 and the connector cover 38. The first lead block 32 is disposed at least partially between the rotator 20 and the second lead block 33 in the axial direction D1. The first lead block 32 is disposed at least partially between the first ring plate 21 and the second lead block 33 in the axial direction D1. The overlapping portion 32A is held at least partially between the first ring plate 21 and the second lead block 33 in the axial direction D1.

Figure 6:
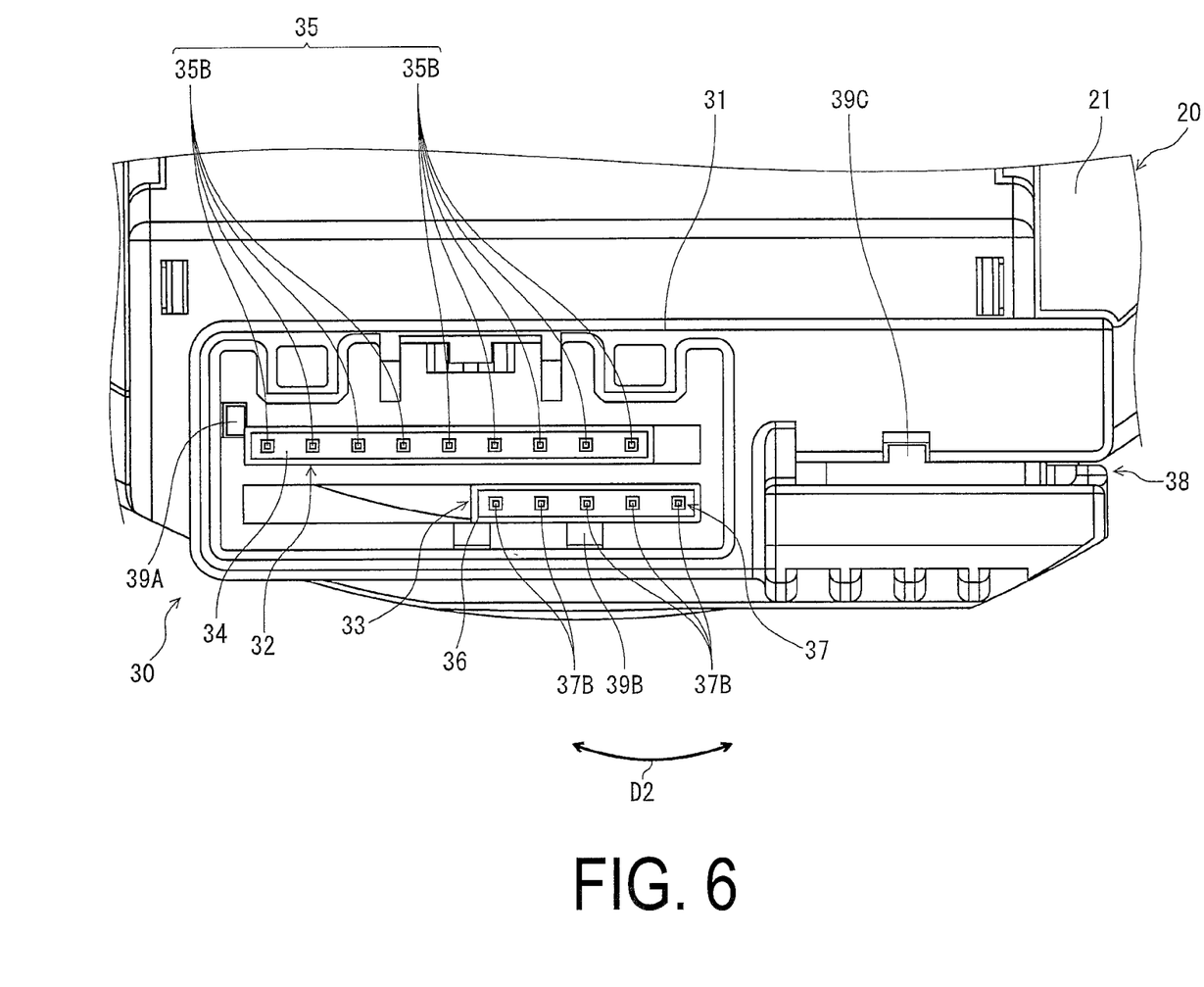
FIG. 6 is a partial plan view of the rotary connector device.
Figure 7:
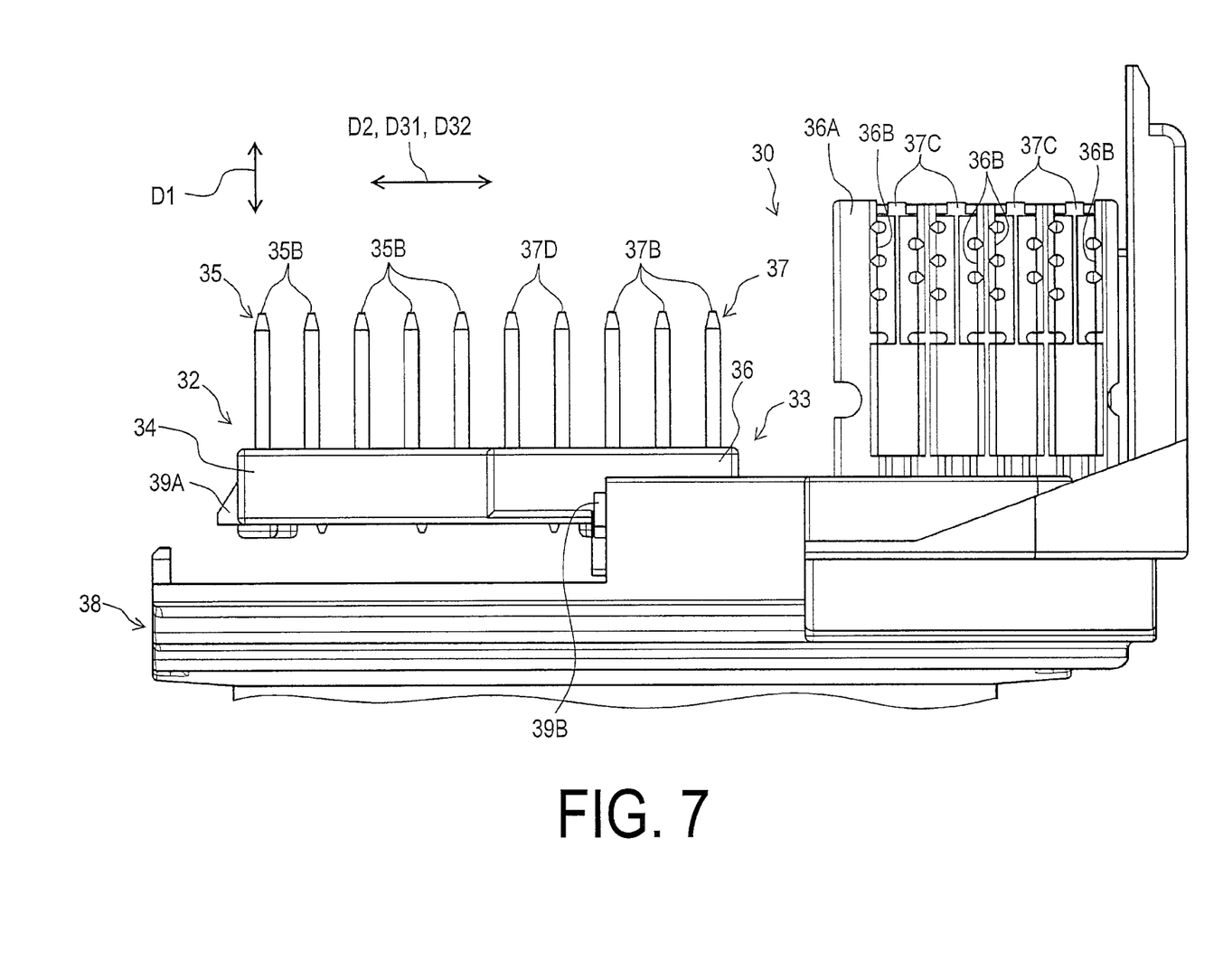
FIG. 7 is a partial elevation view of the first lead block, the second lead block, and the connector cover.
Figure 8:
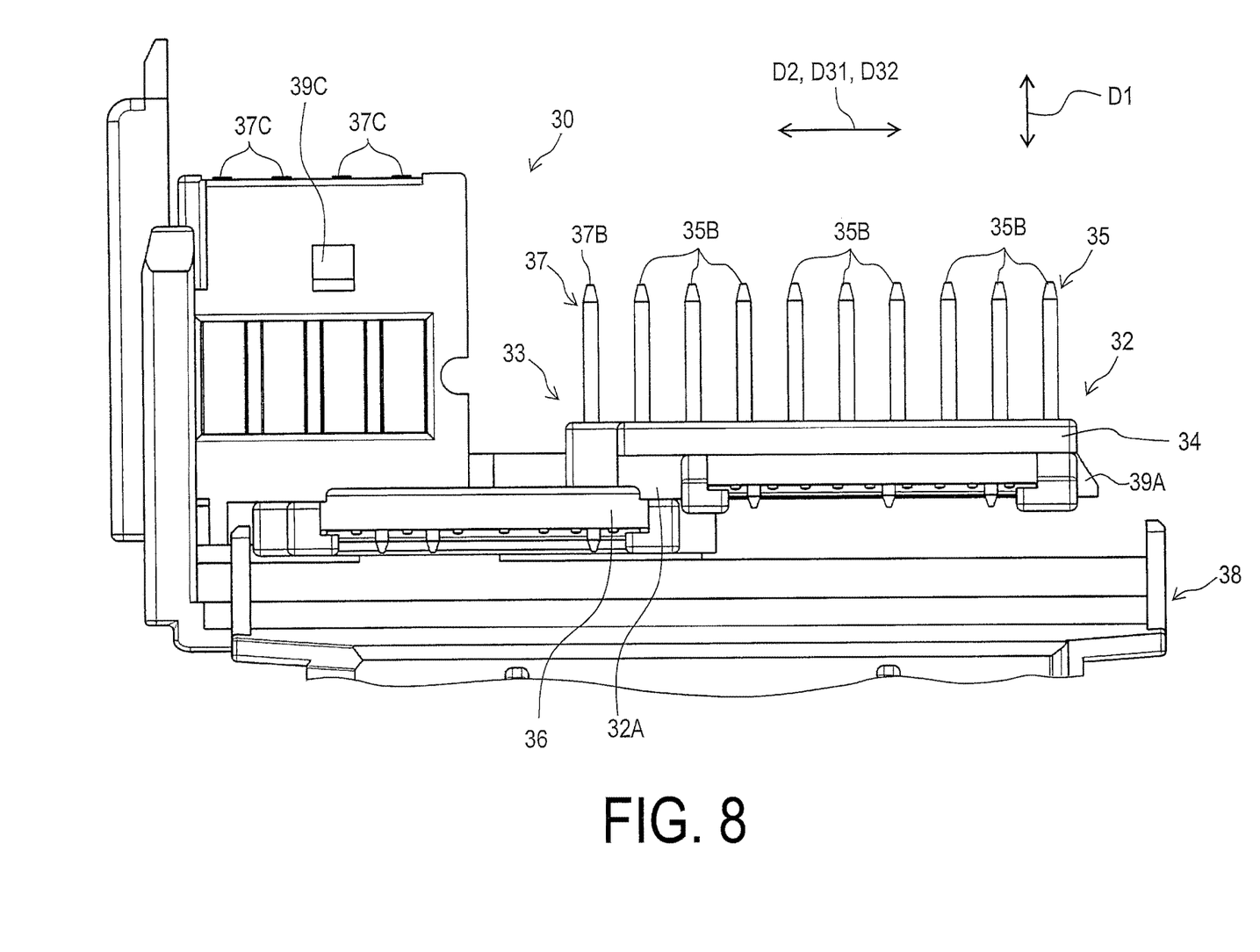
FIG. 8 is a partial elevation view of the first lead block, the second lead block, and the connector cover.

As illustrated in FIGS. 6 to 8, the first lead block 32 includes a first attachment portion 39A. The first attachment portion 39A protrudes from the first lead block body 34 so as to be caught on at least one of the rotator 20 and the first connector housing portion 31. In a state where the first attachment portion 39A is caught on at least one of the rotator 20 and the first connector housing portion 31, the first lead block 32 is attached to the rotator 20.

As illustrated in FIGS. 6 and 8, the second lead block 33 includes second attachment portions 39B and 39C. The second attachment portions 39B and 39C protrude from the second lead block body 36 so as to be caught on at least one of the rotator 20 and the first connector housing portion 31. In a state where the second attachment portions 39B and 39C are caught on at least one of the rotator 20 and the first connector housing portion 31, the second lead block 33 is attached to the rotator 20.

As illustrated in FIG. 7, the plurality of second terminals 37B and 37C extend in the axial direction D1. The second lead block body 36 includes a protruding portion 36A which extends in the axial direction D1. The protruding portion 36A includes a plurality of recessed portions 36B. The plurality of second terminals 37C are respectively disposed in the plurality of recessed portions 36B.

The aspects of the rotary connector device 1 according to the present embodiment are as follows.

(1) As illustrated in FIG. 1, the rotary connector device 1 includes the stator 10, the rotator 20, the first connector 30, and the second connector 40. The rotator 20 is provided so as to be rotatable about the rotation axis A1 with respect to the stator 10. The first connector 30 is provided at the rotator 20. The second connector 40 is provided at the stator 10. As illustrated in FIG. 3, the first connector 30 includes the first lead block 32 which is attached to the rotator 20 and the second lead block 33 which is a member separated from the first lead block 32 and is attached to the rotator 20. When viewed from the axial direction D1 along the rotation axis A1, the first lead block 32 is disposed so as to overlap at least partially the second lead block 33. Thus, the first lead block 32 and the second lead block 33 can be disposed efficiently.

(2) As illustrated in FIG. 3, when viewed from the axial direction D1, the first lead block 32 and the second lead block 33 are disposed side by side in the circumferential direction D2 defined about the rotation axis A1. Thus, the first lead block 32 and the second lead block 33 can be disposed more efficiently.

(3) As illustrated in FIG. 5, the first lead block 32 is disposed at least partially between the rotator 20 and the second lead block 33 in the axial direction D1. Thus, at least a portion of the first lead block 32 can be held between the rotator 20 and the second lead block 33. This makes it possible to efficiently dispose the first lead block 32 and the second lead block 33, and maintain or increase the attachment strength of the first lead block 32.

(4) As illustrated in FIG. 5, the rotator 20 includes the first ring plate 21 and the inner cylindrical portion 22 which extends from an inner peripheral portion of the first ring plate 21 in the axial direction D1. The first lead block 32 is disposed at least partially between the first ring plate 21 and the second lead block 33 in the axial direction D1. Thus, at least a portion of the first lead block 32 can be held between the first ring plate 21 and the second lead block 33. This makes it possible to efficiently dispose the first lead block 32 and the second lead block 33, and maintain or increase the attachment strength of the first lead block 32 with respect to the rotator.

(5) As illustrated in FIG. 3, the first lead block 32 includes the first lead block body 34 including a non-metal material and the first terminal portion 35 including a metal material. The second lead block 33 includes the second lead block body 36 including a non-metal material and the second terminal portion 37 including a metal material. When viewed from the axial direction D1, the first lead block body 34 is disposed so as to overlap at least partially the second lead block body 36. Thus, the first lead block 32 and the second lead block 33 can be disposed more efficiently.

(6) As illustrated in FIG. 3, when viewed from the axial direction D1, the first terminal portion 35 is disposed so as to overlap at least partially the second terminal portion 37. This makes it possible to prevent the increase in the total thickness of an overlapping portion between the first lead block 32 and the second lead block 33.

(7) As illustrated in FIG. 3, the first terminal portion 35 is provided at least partially in the first lead block body 34. The second terminal portion 37 is provided at least partially in the second lead block body 36. Thus, the first terminal portion 35 can be tightly attached to the first lead block body 34, and the second terminal portion 37 can be tightly attached to the second lead block body 36.

(8) As illustrated in FIG. 3, the first terminal portion 35 includes the plurality of first busbars 35A disposed side by side in the first direction D31. The second terminal portion 37 includes the plurality of second busbars 37A disposed side by side in the second direction D32.

(9) As illustrated in FIG. 3, when viewed from the axial direction, the first lead block 32 and the second lead block 33 are disposed side by side in at least one of the first direction D31 and the second direction D32. Thus, the first lead block 32 and the second lead block 33 can be disposed more efficiently.

(10) As illustrated in FIG. 3, when viewed from the axial direction, the first terminal portion 35 and the second terminal portion 37 are disposed side by side in at least one of the first direction D31 and the second direction D32. Thus, the first terminal portion 35 and the second terminal portion 37 can be disposed efficiently.

(11) As illustrated in FIG. 3, when viewed from the axial direction D1, the plurality of first busbars 35A are disposed so as to overlap at least partially the plurality of second busbars 37A. Thus, the plurality of first busbars 35A and the plurality of second busbars 37A can be disposed efficiently.

(12) As illustrated in FIG. 4, the first terminal portion 35 includes the plurality of first terminals 35B which are connected to the plurality of first busbars 35A and extend from the plurality of first busbars 35A in the axial direction D1. The second terminal portion 37 includes the plurality of second terminals 37B which are connected to the plurality of second busbars 37A and extend from the plurality of second busbars 37A in the axial direction D1. This allows other connectors to be easily connected to the first lead block 32 and the second lead block 33 via the first terminal 35B and the second terminal 37B.

(13) As illustrated in FIG. 4, the plurality of first terminals 35B are disposed side by side in the first direction D31. The plurality of second terminals 37B are disposed side by side in the second direction D32. When viewed from the axial direction D1, at least one of the plurality of first terminals 35B is disposed between the rotation axis A1 and at least one of the plurality of second terminals 37B and 37C. Thus, the plurality of first terminals 35B and the plurality of second terminals 37B and 37C can be disposed efficiently.

Note that, in the present application, "comprise" and its derivatives are open ended terms intended to describe the existence of a constituent element and do not exclude the existence of other constituent elements not described. This also applies to "have", "include" and their derivatives.

In the present application, a number such as "first" or "second" is merely a term for identifying a configuration, and does not have any other meaning (e.g., a particular order, or the like). For example, the presence of a "first element" does not imply that a "second element" exists, and the presence of a "second element" does not imply that a "first element" exists.

Expressions such as "parallel", "orthogonal", and "identical" in the present disclosure should not be interpreted strictly and include respectively the meanings of "substantially parallel", "substantially orthogonal", and "substantially identical". Further, representations of other arrangements are not to be strictly interpreted.

Furthermore, the expression "at least one of A and B" in the present disclosure encompasses, for example, all of (1) only A, (2) only B, and (3) both A and B. The expression "at least one of A, B, and C" encompasses, for example, all of (1) only A, (2) only B, (3) only C, (4) A and B, (5) B and C, (6) A and C, and (7) all of A, B, and C. In the present disclosure, the expression "at least one of A and B" is not interpreted as "at least one of A and at least one of B."

Various alterations and modifications of the disclosure are apparent from the foregoing disclosure. Accordingly, the disclosure may be implemented in a manner different from the specific disclosure of the present application without departing from the spirit of the disclosure.

What is claimed is:

1. A rotary connector device comprising:
    a stator;
    a rotator rotatable about a rotation axis with respect to the stator;
    a first connector provided at the rotator; and
    a second connector provided at the stator,
    the first connector comprising a first lead block and a second lead block, the first lead block being attached to the rotator, the second lead block being a member separated from the first lead block and attached to the rotator, and
    the first lead block being disposed so as to overlap at least partially the second lead block, when viewed from an axial direction along the rotation axis.

2. The rotary connector device according to claim 1, wherein
    when viewed from the axial direction, the first lead block and the second lead block are disposed side by side in a circumferential direction defined about the rotation axis.

3. The rotary connector device according to claim 1, wherein
    the first lead block is disposed at least partially between the rotator and the second lead block in the axial direction.

4. The rotary connector device according to claim 3, wherein
    the rotator comprises a first ring plate and an inner cylindrical portion, the inner cylindrical portion extending from an inner peripheral portion of the first ring plate in the axial direction, and
    the first lead block is disposed at least partially between the first ring plate and the second lead block in the axial direction.

5. The rotary connector device according to claim 1, wherein
    the first lead block comprises a first lead block body comprising a non-metal material and a first terminal portion comprising a metal material,
    the second lead block comprises a second lead block body comprising a non-metal material and a second terminal portion comprising a metal material, and
    when viewed from the axial direction, the first lead block body is disposed so as to overlap at least partially the second lead block body.

6. The rotary connector device according to claim 5, wherein
    when viewed from the axial direction, the first terminal portion is disposed so as to overlap at least partially the second terminal portion.

7. The rotary connector device according to claim 5, wherein
    the first terminal portion is provided at least partially in the first lead block body, and
    the second terminal portion is provided at least partially in the second lead block body.

8. The rotary connector device according to claim 5, wherein
    the first terminal portion comprises a plurality of first busbars disposed side by side in a first direction, and
    the second terminal portion comprises a plurality of second busbars disposed side by side in a second direction.

9. The rotary connector device according to claim 8, wherein
    when viewed from the axial direction, the first lead block and the second lead block are disposed side by side in at least one of the first direction and the second direction.

10. The rotary connector device according to claim 8, wherein
    when viewed from the axial direction, the first terminal portion and the second terminal portion are disposed side by side in at least one of the first direction and the second direction.

11. The rotary connector device according to claim 8, wherein
    when viewed from the axial direction, the plurality of first busbars are disposed to overlap at least partially the plurality of second busbars.

12. The rotary connector device according to claim 8, wherein
    the first terminal portion comprises a plurality of first terminals connected to the plurality of first busbars and extending from the plurality of first busbars in the axial direction, and
    the second terminal portion comprises a plurality of second terminals connected to the plurality of second busbars and extending from the plurality of second busbars in the axial direction.

13. The rotary connector device according to claim 12, wherein
    the plurality of first terminals are disposed side by side in the first direction,
    the plurality of second terminals are disposed side by side in the second direction, and
    when viewed from the axial direction, at least one of the plurality of first terminals is disposed between the rotation axis and at least one of the plurality of second terminals.

* * * * *